(12) United States Patent
Park et al.

(10) Patent No.: US 11,153,477 B2
(45) Date of Patent: Oct. 19, 2021

(54) ELECTRONIC APPARATUS AND CONTROLLING METHOD THEREOF

(71) Applicant: SAMSUNG ELECTRONICS CO., LTD., Suwon-si (KR)

(72) Inventors: Daedong Park, Suwon-si (KR); Beomjin Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/793,242

(22) Filed: Feb. 18, 2020

(65) Prior Publication Data

US 2020/0267311 A1 Aug. 20, 2020

(30) Foreign Application Priority Data

Feb. 19, 2019 (KR) .................. 10-2019-0019378

(51) Int. Cl.
| | |
|---|---|
| *H04N 5/232* | (2006.01) |
| *G06T 7/70* | (2017.01) |
| *G06K 9/32* | (2006.01) |
| *H04N 5/225* | (2006.01) |
| *H04N 7/18* | (2006.01) |
| *G02F 1/01* | (2006.01) |

(52) U.S. Cl.
CPC ....... *H04N 5/23219* (2013.01); *G02F 1/0121* (2013.01); *G06K 9/3233* (2013.01); *G06T 7/70* (2017.01); *H04N 5/2253* (2013.01); *H04N 5/2254* (2013.01); *H04N 5/232411* (2018.08); *H04N 7/18* (2013.01); *G06T 2207/30196* (2013.01)

(58) Field of Classification Search
CPC ......... H04N 5/23219; H04N 5/232411; H04N 5/2253; H04N 5/2254; H04N 7/18; G06T 7/70; G02F 1/0121; G06K 9/3233
See application file for complete search history.

(56) References Cited

U.S. PATENT DOCUMENTS 9,794,517 B2 * 10/2017 Ha .......................... G06T 7/20
9,820,625 B2   11/2017 T P et al.
(Continued)

FOREIGN PATENT DOCUMENTS

| JP | 2003-291084 | 10/2003 |
|---|---|---|
| JP | 2003-333388 | 11/2003 |

(Continued)

OTHER PUBLICATIONS

Search Report and Written Opinion dated Jun. 17, 2020 in corresponding International Application No. PCT/KR2020/002358.

*Primary Examiner* — Jonathan R Messmore
(74) *Attorney, Agent, or Firm* — Nixon & Vanderhye P.C.

(57) ABSTRACT

The disclosure provides an electronic apparatus and a controlling method thereof. The electronic apparatus of the disclosure includes a sensor, a camera, and a processor configured to control the electronic apparatus to: obtain information regarding a predetermined object among a plurality of objects included in an imaging region of the camera through the sensor, identify an object region corresponding to the predetermined object from the imaging region of the camera based on the obtained information, and based on the imaging region being captured through the camera, control the camera to not capture the object region.

12 Claims, 9 Drawing Sheets

(56) References Cited

U.S. PATENT DOCUMENTS

2014/0085463 A1     3/2014   Kwon
2017/0318246 A1*   11/2017   Shim .................. H04N 5/23241
2018/0133895 A1     5/2018   Kwak et al.

FOREIGN PATENT DOCUMENTS

| JP | 2003333388 A | * | 11/2003 |
|---|---|---|---|
| KR | 10-2015-0104311 | | 9/2015 |
| KR | 10-1747219 | | 6/2017 |
| KR | 10-2018-0002449 | | 1/2018 |
| KR | 10-2018-0055571 | | 5/2018 |
| KR | 10-2018-0082101 | | 7/2018 |
| WO | 2017/046651 | | 3/2017 |

* cited by examiner

ELECTRONIC APPARATUS AND CONTROLLING METHOD THEREOF

CROSS-REFERENCE TO RELATED APPLICATION

This application is based on and claims priority under 35 U.S.C. to Korean Patent Application No. 10-2019-0019378, filed Feb. 19, 2019, in the Korean Intellectual Property Office, the disclosure of which is incorporated by reference herein in its entirety.

BACKGROUND

1. Field

The disclosure relates to an electronic apparatus and a controlling method thereof, for example, the disclosure relates to an electronic apparatus protecting privacy of a user and a controlling method thereof.

2. Description of Related Art

With the recent development of electronic technologies and needs of consumers, electronic apparatuses obtained by combining cameras with products such as a TV, a cleaner, a refrigerator, a domestic robot, and the like have been universalized, in addition to a dedicated Internet Protocol (IP) camera.

Particularly, there is an issue regarding privacy in a point that a person's face (or body) may be exposed, when an electronic apparatus performs imaging in real time or automatically.

In order to protect privacy of individuals, image processing such as blurring or mosaic creation may be executed with respect to a face, when an image captured with a camera includes a person's face.

However, the image comprising a person's face is stored in a memory (or an external server) before executing the image process, and accordingly, there is still potential possibility of the leakage of a person's face outside due to hacking, backdoor, or the like. In addition, even when the image is removed, a potential danger to the leakage may not be prevented because the image may be restored.

That is, such a type of technology is not a fundamental solution for the privacy issue, because possibility of the invasion of privacy of individuals still exists.

SUMMARY

The disclosure has been made in accordance with the above-described needs, and embodiments of the disclosure provide an electronic apparatus protecting privacy of a user and a controlling method thereof.

According to an example embodiment of the disclosure, an electronic apparatus includes: a sensor, a camera, and a processor configured to control the electronic apparatus to: obtain information regarding a predetermined object among a plurality of objects included in an imaging region of the camera through the sensor, identify an object region corresponding to the predetermined object from the imaging region of the camera based on the obtained information, block a light corresponding to the object area, and obtain an image corresponding to the imaging region of the camera excluding the object region through the camera.

According to another example embodiment of the disclosure, a method of controlling an electronic apparatus comprising a sensor and a camera, is provided, the method including: obtaining information regarding a predetermined object among a plurality of objects existing in an imaging region of the camera through the sensor, identifying an object region corresponding to the predetermined object from the imaging region of the camera based on the obtained information, blocking a light corresponding to the object area, and obtaining an image corresponding to the imaging region of the camera excluding the object region through the camera.

According to various example embodiments of the disclosure described above, an electronic apparatus protecting privacy of individuals and a controlling method thereof may be provided.

In the electronic apparatus and the controlling method thereof of the disclosure, an image of a remaining region excluding and object region, for example, a person's face, may be generated, when capturing an image. Accordingly, possibility of leakage of an image comprising a person's face or invasion of privacy due to the image comprising a person's face may be fundamentally avoided.

In addition, a service that collects (or provides) images not invading privacy of individuals may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
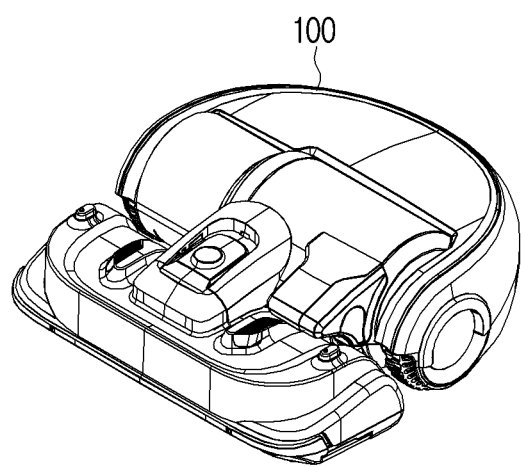
FIG. 1 is a diagram illustrating an example electronic apparatus according to an embodiment.

In describing the disclosure, a detailed description of the related art may omitted when it is determined that the detailed description may unnecessarily obscure a gist of the disclosure. In addition, the following example embodiments may be modified in many different forms, and the scope of the technical spirit of the disclosure is not limited to the following embodiments. Rather, these example embodiments are provided to convey the technical spirit to those skilled in the art.

It should be noted that the example embodiments disclosed in this disclosure are illustrative and do not limit the scope of the disclosure to a specific embodiment, and should be interpreted to include all modifications, equivalents or alternatives of the embodiments of the disclosure. In relation to explanation of the drawings, similar drawing reference numerals may be used for similar elements.

The expressions "first," "second" and the like used in the disclosure may denote various elements, regardless of order and/or importance, and may be used to distinguish one element from another, and does not limit the elements.

In the disclosure, expressions such as "A or B", "at least one of A [and/or] B,", or "one or more of A [and/or] B," include all possible combinations of the listed items. For example, "A or B", "at least one of A and B,", or "at least one of A or B" includes any of (1) at least one A, (2) at least one B, or (3) at least one A and at least one B.

Unless otherwise defined specifically, a singular expression may encompass a plural expression. It is to be understood that the terms such as "comprise" or "consist of" are used herein to designate a presence of characteristic, number, step, operation, element, part, or a combination thereof, and not to preclude a presence or a possibility of adding one or more of other characteristics, numbers, steps, operations, elements, parts or a combination thereof.

If it is described that a certain element (e.g., first element) is "operatively or communicatively coupled with/to" or is "connected to" another element (e.g., second element), it should be understood that the certain element may be connected to the other element directly or through still another element (e.g., third element). On the other hand, if it is described that a certain element (e.g., first element) is "directly coupled to" or "directly connected to" another element (e.g., second element), it may be understood that there is no element (e.g., third element) between the certain element and another element.

Also, the expression "configured to" used in the disclosure may be interchangeably used with other expressions such as "suitable for," "having the capacity to," "designed to," "adapted to," "made to," and "capable of," depending on cases. Meanwhile, the expression "configured to" does not necessarily refer to a situation in which a device is "specifically designed to" in terms of hardware. Instead, under some circumstances, the expression "a device configured to" may refer, for example, to the device being "capable of" performing an operation together with another device or component. For example, the phrase "a processor configured (or set) to perform A, B, and C" may refer, for example, and without limitation, to a dedicated processor (e.g., an embedded processor) for performing the corresponding operations, a generic-purpose processor (e.g., a CPU or an application processor) that can perform the operations by executing one or more software programs stored in a memory device, or the like.

An electronic apparatus according to various embodiments of the disclosure may include at least one of, for example, and without limitation, a smartphone, a tablet personal computer (PC), a mobile phone, a video phone, an e-book reader, a desktop personal computer (PC), a laptop personal computer (PC), a netbook computer, a workstation, a server, a personal digital assistant (PDA), a portable multimedia player (PMP), an MP3 player, a mobile medical device, a camera, a wearable device, or the like. According to various embodiments, a wearable device may include, for example, and without limitation, at least one of an accessory type (e.g., a watch, a ring, a bracelet, an ankle bracelet, a necklace, a pair of glasses, a contact lens or a head-mounted-device (HMD)); a fabric or a garment-embedded type (e.g., electronic cloth); skin-attached type (e.g., a skin pad or a tattoo); a bio-implant type (e.g., implantable circuit), or the like.

In addition, in various example embodiments, the electronic apparatus may be home appliance. The home appliance may include at least one of, for example, and without limitation, a television, a digital video disk (DVD) player, an audio system, a refrigerator, an air-conditioner, a vacuum cleaner, an oven, a microwave, a washing machine, an air purifier, a set top box, a home automation control panel, a security control panel, a media box (e.g., SAMSUNG HOMESYNC™, APPLE TV™, or GOOGLE TV™), a game console (e.g., XBOX™, PLAYSTATION™), an electronic dictionary, an electronic key, a camcorder, an electronic frame, or the like.

In other example embodiments, the electronic apparatus may include, for example, and without limitation, at least one of a variety of medical devices (e.g., various portable medical measurement devices such as a blood glucose meter, a heart rate meter, a blood pressure meter, or a temperature measuring device, magnetic resonance angiography (MRA), magnetic resonance imaging (MRI), or computed tomography (CT) scanner, or ultrasonic wave device, etc.), a navigation system, a global navigation satellite system (GNSS), an event data recorder (EDR), a flight data recorder (FDR), an automotive infotainment device, marine electronic equipment (e.g., marine navigation devices, gyro compasses, etc.), avionics, a security device, a car head unit, industrial or domestic robots, an automated teller machine (ATM), a point of sale of (POS) a store, an Internet of Things (IoT) device (e.g., light bulbs, various sensors, electronic or gas meters, sprinkler devices, fire alarms, thermostats, street lights, toasters, exercise equipment, hot water tanks, heater, boiler, etc.), or the like.

According to still another embodiment, the electronic apparatus may include, for example, and without limitation, at least one of a part of furniture or building/structure, an electronic board, an electronic signature receiving device, a projector, various measurement devices (e.g., water, electric, gas, or wave measurement devices), or the like. In various embodiments, the electronic apparatus may be implemented as one of the various apparatuses described above or a combination of two or more thereof. The electronic apparatus according to a certain embodiment may be a flexible electronic apparatus. The electronic apparatus according to the embodiment of this document is not limited to the devices described above and may include a new electronic apparatus along the development of technologies.

FIG. 1 is a diagram illustrating an example electronic apparatus according to an embodiment of the disclosure.

Referring to FIG. 1, an electronic apparatus 100 may capture a plurality of objects existing in an imaging region and obtain an image comprising the plurality of objects. The electronic apparatus 100 may be positioned at a place where the privacy issue may occur. For example, the electronic apparatus 100 may be positioned in a house.

In this case, the electronic apparatus 100 may capture a remaining region excluding a predetermined object among the plurality of objects existing in the imaging region, so that the predetermined object is not included in an image. The predetermined object may, for example, be a subject which may cause the privacy issue, that is, a subject for which invasion of privacy is prevented and/or reduced. For example, the predetermined object may include, for example, and without limitation, a person in a house.

The electronic apparatus 100 may identify an object region corresponding to the predetermined object from the imaging region, when there is the predetermined object among the plurality of objects existing in the imaging region.

The imaging region (or a capturing region) may refer, for example, to a region where the capturing may be performed in real space (or region to be captured). The imaging region (three-dimensional space of reality) may correspond to a plurality of pixels included in an image (two-dimensional plane or three-dimensional space) obtained through the capturing. When the imaging region is projected on the image through the capturing, mapping may be performed so that a plurality of dots (positions or coordinates) included in the imaging region correspond to a plurality of pixels (positions or coordinates) included in the image.

The object region may include a region of the image occupied by (or to be occupied by) the predetermined object.

The electronic apparatus 100 may perform control to not capture the object region, when imaging the imaging region, and obtain an image of only the remaining region excluding the object region.

According to the electronic apparatus 100 of the disclosure described above, when capturing an image, an image of the remaining region excluding, for example, a person's face may be generated. Accordingly, possibility of leakage of an image comprising a person's face or invasion of privacy due to the image comprising a person's face may be fundamentally avoided.

In addition, the electronic apparatus 100 of the disclosure may provide a service that collects (or provides) images not invading privacy of individuals.

Figure 2A:
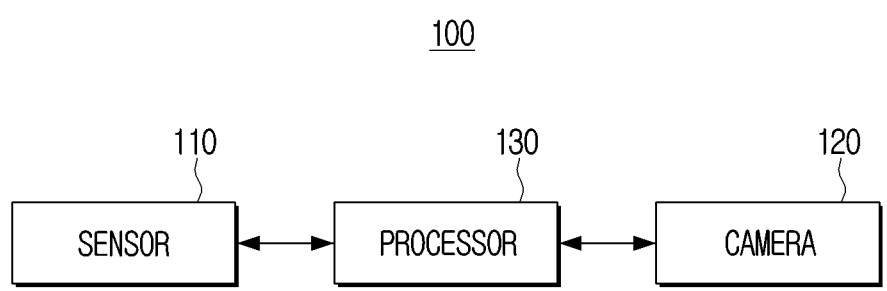
FIG. 2A is a block diagram illustrating an example electronic apparatus according to an embodiment.

FIG. 2A is a block diagram illustrating an example electronic apparatus according to an embodiment of the disclosure.

Referring to FIG. 2A, the electronic apparatus 100 may include a sensor 110, a camera 120, and a processor (e.g., including processing circuitry) 130.

The sensor 110 may, for example, include an apparatus or a component (e.g., including circuitry) which recognizes (or detects) an object, and may obtain information regarding an object existing in the imaging region of the camera 120 based on a position and a direction of the camera 120. However, this is merely an embodiment, and the sensor 110 may obtain data for calculating the information regarding an object, transmit the data to the processor 130, and obtain the information regarding an object, when the processor 130 processes the received data. A region detected by the sensor 110 at that time may include the imaging region of the camera 120.

The object may, for example, be a person or a matter existing in the real space. The information regarding an object may include a distance between (or a position of) the camera 120 and an object and a size of an object.

For this, the sensor 110 may include, for example, and without limitation, at least one of a laser sensor (not shown), an ultrasonic wave sensor (not shown), an infrared ray sensor (not shown), and a heat detection sensor (not shown).

The laser sensor may emit a laser pulse using time of flight (TOF), receives a signal returning due to reflection by an object, and measure intensity of the received signal, time, an absorption difference depending on wavelength, or wavelength movement to measure a distance from (or a position of) the object and a size of the object.

The ultrasonic wave sensor may emit an ultrasonic pulse having a frequency equal to higher than 20 kHz using time of flight (TOF), receive a signal returning due to reflection by an object, and measure a distance from (or a position of) the object and a size of the object according to the emission and a time difference of the received signals.

The infrared ray sensor may emit an infrared ray having a wavelength of approximately 750 nm to 1,500 nm using time of flight (TOF), receive a signal returning due to reflection by an object, and measure intensity or an angle of the received signal to measure a distance from (or a position of) the object and a size of the object.

The heat detection sensor may measure a temperature of the object according to thermal radiation (or photons) emitted by the object and calculate a distance from (or a position of) the object and a size of the object.

The sensor 110 or the processor 130 may communicate with an external device such as a wearable device to calculate a distance from the object or receive information regarding a distance from the object.

The camera 120 may refer, for example, to a component capable of obtaining an image of the imaging region. The imaging region may refer, for example, to a region where the capturing may be performed in real space (or region to be captured) and the imaging region may be determined in accordance with a focal length of a lens and an angle of view.

Figure 2B:
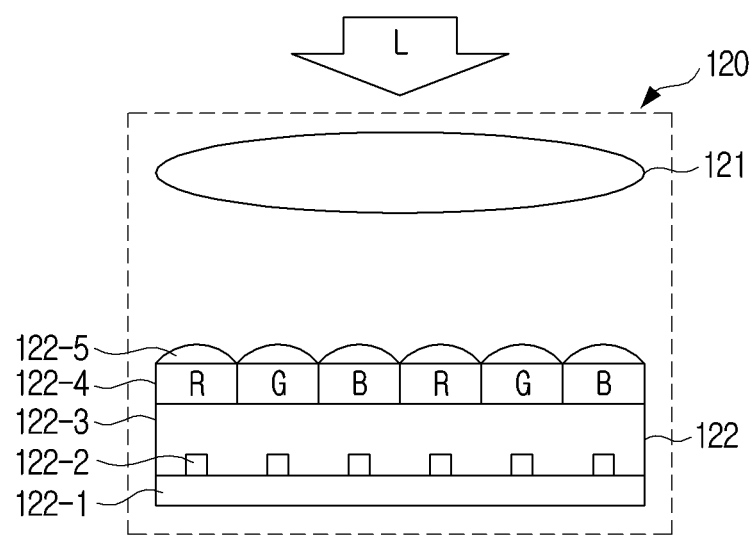
FIG. 2B is a diagram illustrating an example camera according to an embodiment.

Referring to FIG. 2B, the camera 120 may include a lens 121, an image sensor 122, and an image processor (not shown).

The lens 121 may refer, for example, to a component capable of transmitting or concentrating light, and the imaging region may vary depending on a focal length and an angle of view (field of view (FOV)) of the lens 121. The lens 121 may be implemented as a single lens or an assembly of lenses consisting of a plurality of lenses.

The electronic apparatus 100 may store information regarding a focal length and an angle of view of the lens 121 in advance. The focal length may refer, for example, to a distance from an optical center (or principal point) of the lens 121 to a focal point where an image converges. The angle of view may refer, for example, to an angle at which the imaging may be performed.

The image sensor 122 may refer, for example, to a component for obtaining an image corresponding to the imaging region excluding the object region light transmitted through the lens 121 and may include a substrate 122-1, a transistor 122-2, a light detection element 122-3, a color filter 122-4, a microlens 122-5, a shutter (not shown), and an aperture (not shown). The image sensor 122 may be implemented as, for example, and without limitation, a charge-coupled device (CCD), a complementary metal-oxide-semiconductor (CMOS), or the like.

The substrate 122-1 may refer, for example, to a component for electrically connecting the transistor 122-2 and the light detection element 122-3, fixing these at specific positions, and protecting these from the outside. The substrate 122-1 may include a circuit including elements such as, for example, and without limitation, an electrode, a lead wire, an insulator (dielectric), a capacitor, and the like.

The transistor 122-2 may refer, for example, to a component which converts an electric signal detected by the light detection element 122-3 into a digital signal and transmits the digital signal to an image processor (not shown) and the transistor 122-2 may be provided between the light detection element 122-3 and the substrate 122-1. However, this is merely an embodiment and the transistor 122-2 may be provided in the substrate 122-1.

The light detection element 122-3 may refer, for example, to a component for obtaining information (optical information) regarding a color, an intensity, and a position of light or photons, and may detect light transmitted through the lens 121, the microlens 122-5, and the color filter 122-4, generate (or convert) an electric signal, and output (or transmit) the generated (or converted) electric signal to the transistor 122-2. The light detection element 122-3 may be implemented, for example, and without limitation, as a photodiode, a photogate, a phototransistor, or the like, or any combination thereof.

A plurality of light detection elements 122-3 may be arranged in an array having a matrix shape (e.g., M×N, M and N are natural numbers). For example, the light detection elements 122-3 may be arranged at specific positions (or coordinates) in the array to be independently distinguished and the positions of the light detection elements 122-3 may correspond to positions (or coordinates) of pixels constituting an image.

The color filter 122-4 may refer, for example, to a component for obtaining information regarding a color of light and may be formed (or arranged) between the microlens 122-5 and light detection element 122-3 and transmit light having a specific color which is incident through the microlens 122-5. The color filter 122-4 may absorb light having other colors excluding the specific color of the incident light. The color filter 122-4 may include, for example, one of a red (R), green (G), or blue (B) filter. The R filter may be implemented as an optical filter transmitting red light, the G filter may be implemented as an optical filter transmitting green light, and the B filter may be implemented as an optical filter transmitting blue light.

The microlens 122-5 may refer, for example, to a component for concentrating light transmitted through the lens 121 to the light detection element 122-3, and may be formed (or arranged) on an upper portion of the color filter 122-4, concentrate light transmitted through the lens 121, and transmit the light to the light detection element 122-3 through the color filter 122-4. A plurality of microlenses 122-5 may be arranged in an array having a matrix shape (e.g., M×N, M and N are natural numbers) on the same plane, and the matrix shape may correspond to the matrix shape in which the light detection elements 122-3 are arranged one to one or X:Y (X and Y are natural numbers).

The shutter (not shown) may refer, for example, to a component which adjusts time for incidence of light and an amount of light accumulated on exposed pixels of the image sensor 122 is identified in accordance with a speed of the shutter. The aperture (not shown) may refer, for example, to a component which adjusts an amount of light transmitted and incident through the lens 121. The aperture may have an openable mechanical structure. However, this is merely an embodiment and the aperture may be replaced with glass formed on an upper portion of the lens 121 and having adjustable transmittance.

The image processor may include various processing circuitry and process the digital signal detected and converted by the light detection element 122-3 and output a plurality of pieces of pixel data. The pixel data may include information regarding a brightness value of a pixel, a color value of a pixel, a position (or coordinate) of a pixel, and the like and an image may be generated (or obtained) based on the pixel data. That is, the image may include a plurality of pixels having a resolution in a matrix shape (e.g., P×Q, P and Q are natural numbers).

The structure of the camera 120 shown in FIG. 2B is merely an embodiment of the disclosure and may be implemented in various modified structures such as, for example, and without limitation, structures of ISOCELL, Quantum Film, an organic thin film and the like.

Figure 2C:
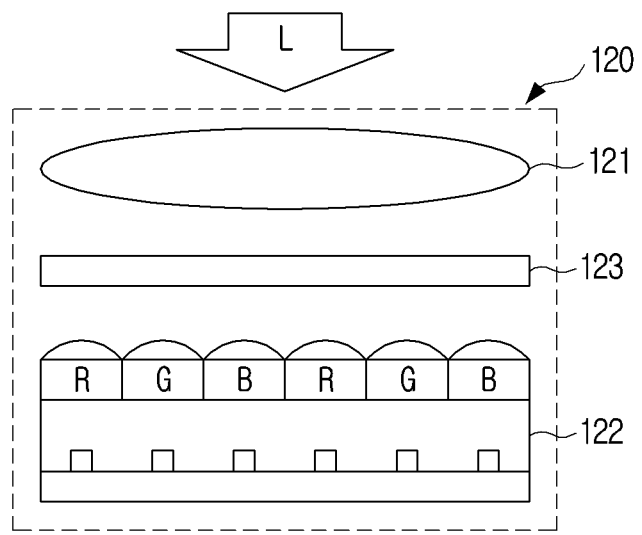
FIG. 2C is a diagram illustrating an example camera according to an embodiment.

Referring to FIG. 2C, the camera 120 may further include a glass 123 disposed on a path of light and having adjustable transmittance. The transmittance herein may refer, for example, to a percentage of light transmitted through the glass 123 and may include, for example, a value obtained by subtracting reflectance and absorptivity from 100% (transmittance=1−reflectance−absorptivity).

The glass 123 having adjustable transmittance may, for example, change its color (or brightness) in accordance with, for example, and without limitation, a voltage, a temperature, or a frequency, and accordingly, the transmittance of light may change. The transmittance of the entire region or some regions of the glass 123 having adjustable transmittance may change. The glass 123 having adjustable transmittance may be implemented, for example, and without limitation, as a glass substrate containing indium oxide (ITO), titanium oxide ($TiO_2$), or the like, smart glass, smart window, a polarizing plate, a liquid crystal display (LCD), an electronic ink (e-ink) display, or the like. The glass 123 having adjustable transmittance may refer, for example, to a matter (or a material, quality of a material, etc.) having adjustable transmittance and thus, a matter which is not glass but has adjustable transmittance may be included in the glass 123 having adjustable transmittance of the disclosure.

In addition, the glass 123 having adjustable transmittance may be disposed on a path of light. For example, the glass 123 having adjustable transmittance may be disposed on a front surface or a rear surface of the lens 121 according to a path of light incident to or light transmitted through the lens 121. In addition, the glass 123 having adjustable transmittance may be disposed on an upper surface of the image sensor 122.

In an embodiment, assuming that the glass 123 having adjustable transmittance has an LCD structure, the glass 123 having adjustable transmittance may include an upper plate, a lower plate, and a liquid crystals (LC).

The upper plate and the lower plate may be transparent to transmit light and a circuit may be formed in order to protect the liquid crystals formed between the upper plate and the lower plate and transmit an electric signal regarding the liquid crystals at a specific position. For this, the upper plate and the lower plate may be implemented as films, thin films, or substrates having a material of a polymer, glass, or PET. The liquid crystals may be formed between the upper plate and the lower plate and, when particles of the liquid crystals are oriented vertically or horizontally by an external voltage, a difference in refractive index may change between the upper plate and the lower plate and the transmittance may be adjusted. For example, the liquid crystals may be divided in an array and arranged in a matrix shape and each arranged position may correspond to the position of the pixel of the image sensor 122 one to one or at 1:M (M is a natural number of 2 or more).

In an embodiment, assuming that the glass 123 having adjustable transmittance is an e-ink display, the glass 123 having adjustable transmittance may include an upper plate, a lower plate, and electronic ink. The above description of the LCD may be applied to the upper plate and the lower plate, and the electronic ink may be arranged so that electronic ink particles may block light by an external voltage, thereby adjusting transmittance. The electronic ink may be formed between the upper plate and the lower plate and may be implemented as particles of a conductive material dissolved in a colloidal state having a diameter of 10 to 100 nanometers (nm).

The processor 130 may include various processing circuitry and control general operations of the electronic apparatus 100. As described herein, when reference is made to the processor 130 performing various functions, it will be understood that the processor 130 may control the electronic apparatus 100 to perform the various operations under control of the processor 130. Hereinafter, the description will be made with reference to FIGS. 3, 4 and 5 to describe the operations of the processor 130 and the electronic apparatus 100 according to various embodiments of the disclosure.

The processor 130 may obtain information regarding a predetermined object among the plurality of objects existing in the imaging region of the camera 120 through the sensor 110. The electronic apparatus 100 may be positioned in a house.

The information regarding the predetermined object may include, for example, and without limitation, a distance between the camera 120 and the predetermined object and a size of the predetermined object (e.g., height, weight, etc.). The predetermined object may include, for example, and without limitation, a person existing in the house (e.g., an operator or a user of the electronic apparatus 100, or a guest). For example, the predetermined object may include a part of a person's body such as a person's face or the entire part thereof.

Figure 3:
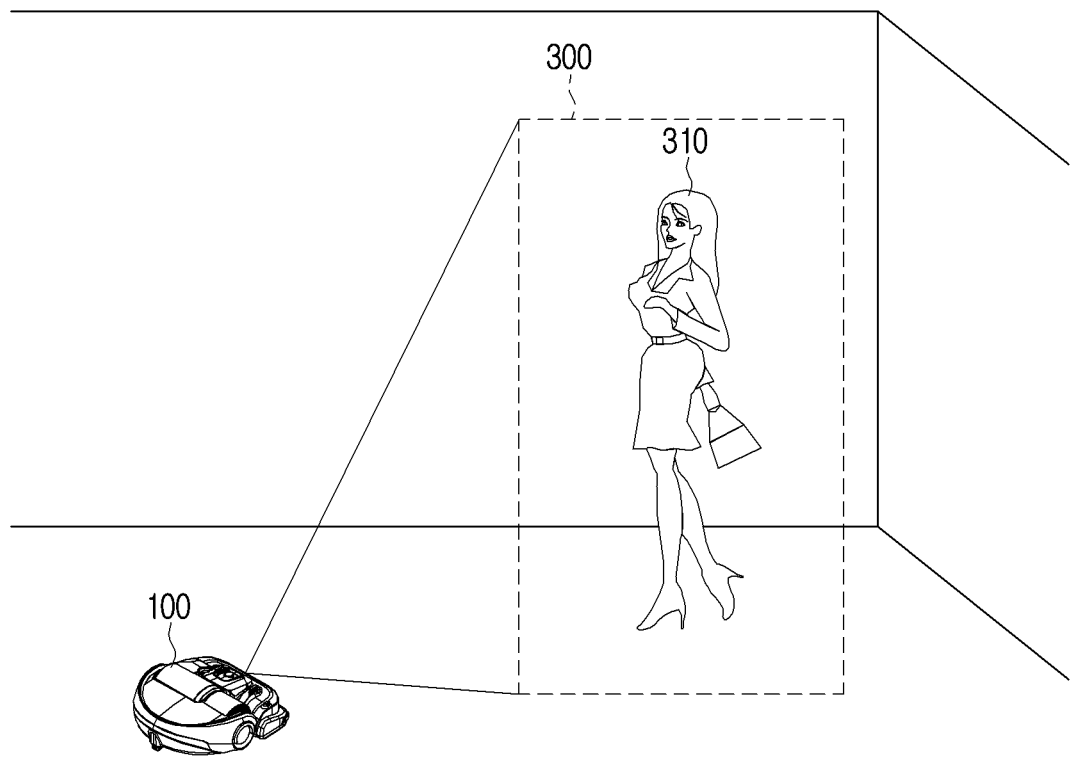
FIG. 3 is a diagram illustrating an example electronic apparatus according to an embodiment.

Hereinafter, a predetermined object 310 existing in an imaging region 300 will be described with reference to FIG. 3 assuming, for convenience of explanation, that it is a person (or a user).

The processor 130 may obtain information regarding a first object 310 (or a second object) existing in the imaging region 300 of the camera 120 through the sensor 110. The information regarding the first object (or the second object) may include a distance between the camera 120 and the first object (or the second object), a size or appearance of the first object (or the second object), and the like.

For this, the processor 130 may provide a user addition step through a user interface (UI) for adding (or registering) and storing the predetermined object 310 (e.g., an operator or a user of the electronic apparatus 100, or a family member).

The processor 130 may control an output interface 160 (e.g., shown in FIG. 6) to display a UI for adding the predetermined object 310 (e.g., guidance messages, menu for selecting the addition of the predetermined object 310, and the like).

Figure 6:
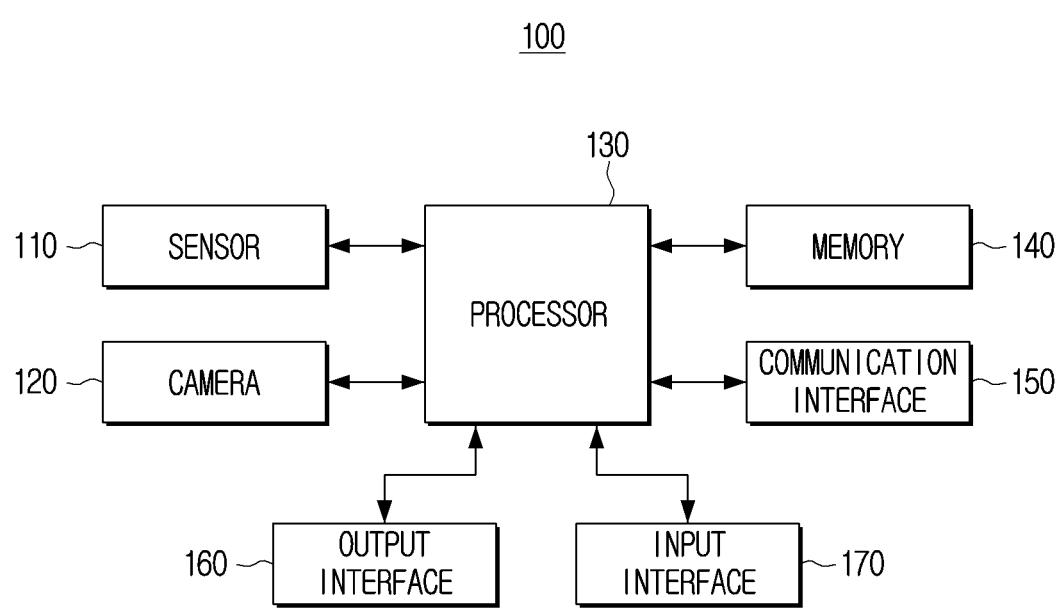
FIG. 6 is a block diagram illustrating an example configuration of an example electronic apparatus according to an embodiment.

When a user command made from the selection of the addition of the predetermined object 310 on the UI through an input interface 170 (e.g., a touch panel, buttons, or a remote control) shown in FIG. 6 is received, the processor 130 may obtain information regarding an object existing in the imaging region of the camera 120 through the sensor 110 and/or an image of an object captured by the camera 120 as the information regarding the predetermined object 310 and store the information regarding the predetermined object 310 in a memory 140 of the electronic apparatus 100.

In addition, the processor 130 may store body information (e.g. height, weight, body type (or appearance), age, sex, etc.) received through the input interface 170 or a communication interface 150 in the memory 140 as the information regarding the predetermined object 310.

The information regarding the predetermined object 310 has been stored in the electronic apparatus 100, but this is merely an embodiment, and the processor 130 may control the communication interface 150 to transmit the information regarding the predetermined object 310 to an external electronic apparatus (e.g., a smart phone, a server, or the like) and store the information regarding the predetermined object 310 in an external electronic apparatus.

In addition, the memory 140 of the electronic apparatus 100 or an external electronic apparatus may store standardized body information in advance as the information regarding the predetermined object 310. The standardized body information may be used as information for identifying the predetermined object 310 or identifying a size of the predetermined object 310.

The processor 130 may identify whether the first object (or the second object) corresponds to the predetermined object 310, based on information regarding the first object (or the second object) obtained through the sensor 110.

The processor 130 may identify whether=the first object (or the second object) corresponds to the predetermined object 310 according to existence or nonexistence of the information regarding the predetermined object 310 or the standardized body information matched with the information regarding the first object (or the second object) obtained through the sensor 110.

In an embodiment, the processor 130 may calculate (or determine) a similarity showing how similar the information regarding the first object (or the second object) obtained through the heat detection sensor (e.g., a temperature, appearance of the object, and the like) is to the predetermined object 310, and identify that an object having a similarity equal to or more than a threshold value corresponds to the predetermined object 310. For this, the electronic apparatus 100 may store determination criteria or the like for calculating the similarity in advance.

In another embodiment, the processor 130 may input information regarding the first and second objects obtained through the sensor 110 to an artificial intelligence model and identify whether or not the first and second objects correspond to the predetermined object 310 according to the result. The artificial intelligence model may refer, for example, to an artificial intelligence model trained to identify whether or not an object corresponds to the predetermined object 310 using the information regarding an object as learning data and may be implemented as a nerve network model, a gene model, or a probability statistics model.

Figure 4:
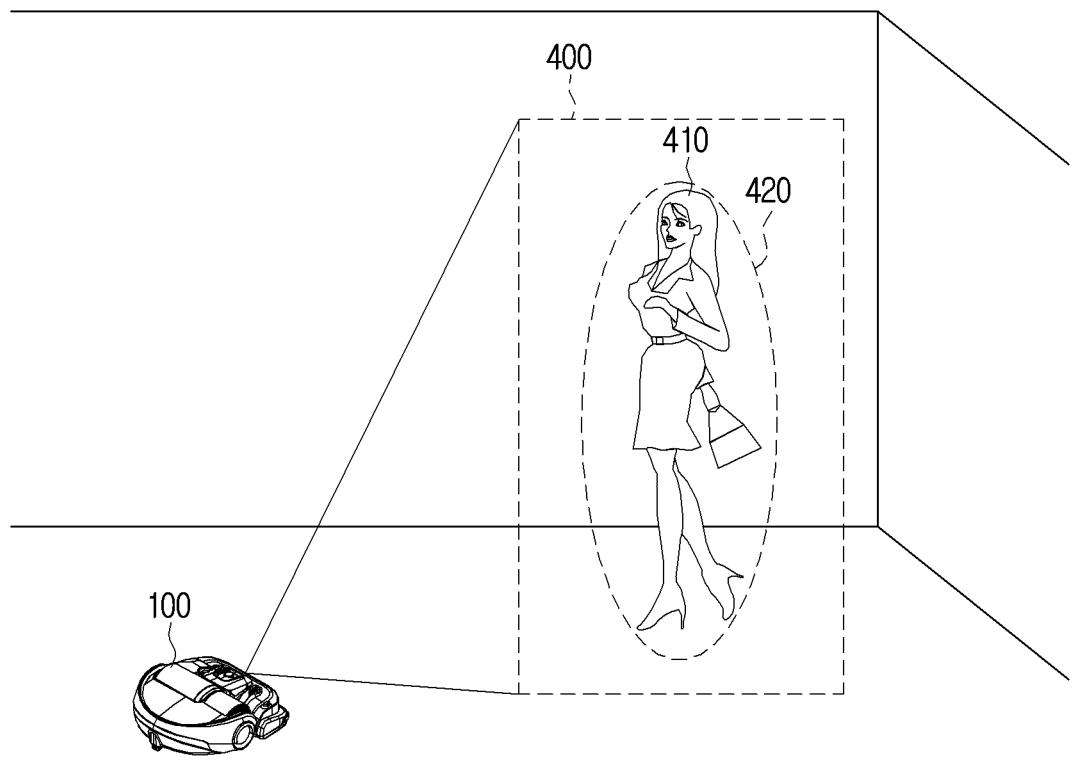
FIG. 4 is a diagram illustrating an example object region according to an embodiment.

Hereinafter, the description will be made with reference to FIG. 4 assuming, for ease and convenience of description, that a first object among the plurality of objects existing in an imaging region 400 is identified as a predetermined object 410. Information regarding the first object may be identified as information regarding the predetermined object 410.

The processor 130 may identify an object region 420 corresponding to the predetermined object 410 from the imaging region 400 of the camera 120 based on the information regarding the predetermined object 410.

The processor 130 may identify the object region 420 from the imaging region 400 of the camera 120 based on a distance between the camera 120 and the predetermined object 410 and a size of the predetermined object 410 obtained through the sensor 110, and a focal length of the camera 120.

The processor 130 may identify the object region 420 (comprising a position, a size, an area, a boundary, and the like) occupied by the predetermined object 410 from the imaging region (or an image) of the camera 120, based on a distance between the camera 120 and the predetermined object 410 and a size of the predetermined object 410 obtained through the sensor 110, and a focal length of the camera 120. The processor 130 may, for example, and without limitation, perform blurring, patterning, mosaic processing, processing, or the like, with a specific color with respect to the object region 420.

For example, when a distance between the camera 120 and the predetermined object 410 and a size of the predetermined object 410 are constant, the processor 130 may identify the narrower object region 420, as a focal length of the camera 120 (or a focal length of the lens 121) is short (or near), and identify the wider object region 420, as a focal length of the camera 120 (or a focal length of the lens 121) is long (or far).

When the focal length of the camera 120 and the size of the predetermined object 410 are constant, the processor 130 may identify the wider object region 420, as a distance between the camera 120 and the predetermined object 410 is short, and determine the narrower object region 420, as a distance between the camera 120 and the predetermined object 410 is long.

When the distance between the camera 120 and the predetermined object 410 and the focal length of the camera 120 are constant, the processor 130 may determine the narrower object region 420, as the size of the predetermined object 410 is small, and determine the wider object region 420, as the size of the predetermined object 410 is great.

Figure 5:
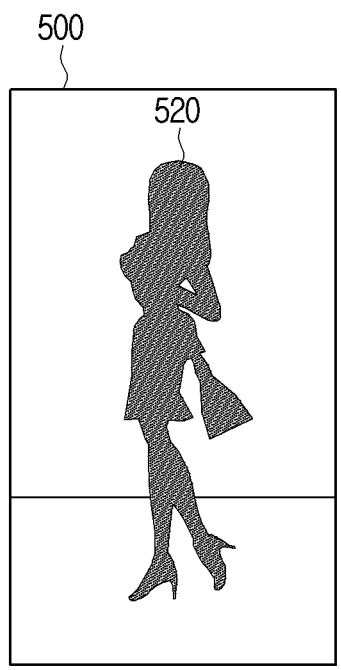
FIG. 5 is a diagram illustrating an example image obtained through a camera according to an embodiment.

Hereinafter, it is assumed, for ease and convenience of description, that the processor 130 obtains an image by imaging an imaging region through the camera 120 with reference to FIG. 5.

The processor 130 may control the camera 120 to not capture an object region 520, when an imaging region 500 is captured through the camera 120. In other words, the processor 130 may control the camera 120 to capture a remaining region of the imaging region 500 excluding the object region 520, and then the processor 130 may obtain an image corresponding to the remaining region excluding the object region 520.

The processor 130 may obtain an image of a remaining region excluding the object region 520, by controlling the camera 120 to not capture the object region 520, while the imaging region 500 is captured through the camera 120. The processor 130 may perform blurring, patterning, mosaic processing, or processing with a specific color with respect to the object region 520.

In an embodiment of the disclosure, the processor 130 may cut off a power supply of at least one light detection element corresponding to the object region 520 among the plurality of light detection elements.

As described above, the plurality of light detection elements may be arranged in an array having a matrix shape (e.g., M×N, M and N are natural numbers) and a position (or a coordinate) of each of the plurality of light detection elements in the array may correspond to a position (or a coordinate) of the imaging region 500 (or an image).

The processor 130 may cut off a power supply of at least one light detection element corresponding to the object region 520 among the plurality of light detection elements, so that the object region 520 is not imaged, when imaging the imaging region 500 through the camera 120.

The camera 120 may further include a power supply circuit unit (not shown) which supplies the power to the light detection elements or cuts off the supply of the power thereto. The processor 130 may control the power supply circuit unit to cut off the supply of the power to at least one light detection element corresponding to the object region 520 among the plurality of light detection elements and supply the power to the other light detection elements.

The light detection element, whose power supply is cut off, may not execute the operation of detecting the received light, and accordingly, pixels existing in the object region 520 may have pixel data of the same color (e.g., black).

For example, assuming that the plurality of light detection elements are arranged in an array having a matrix shape of 1920×1080 and the object region 520 is a region included in a square having vertices of [100, 100], [100, 200], [200, 100], and [200, 200], the processor 130 may control the power supply circuit unit to cut off the power of the light detection elements corresponding to the region included in the square having vertices of [100, 100], [100, 200], [200, 100], and [200, 200] and supply the power of the light detection elements corresponding to the remaining region.

The processor 130 may obtain an image, in which pixels existing in the object region 520 are black, by capturing the imaging region 500 to not capture the object region 520 through the camera 120.

In another embodiment of the disclosure, the camera 120 may further include the glass 123 having adjustable transmittance which is disposed on a path of light. In this case, the processor 130 may adjust the transmittance of the glass 123 so that the light corresponding to the object region 520 is blocked.

The processor 130 may adjust the transmittance of the glass 123 so that the light corresponding to the object region 520 is blocked, so that the object region 520 is not imaged, when imaging the imaging region 500 through the camera 120.

In the glass 123, a transmittance adjusting material (e.g., e-ink or liquid crystals) may be arranged in an array having a matrix shape (e.g., M×N, M and N are natural numbers) in the glass 123 or on an outer surface thereof. The transmittance of each transmittance adjusting material arranged in a matrix shape may be individually adjusted.

The processor 130 may adjust the transmittance of the transmittance adjusting material corresponding to the object region 520 of the glass 123 so that the light corresponding to the object region 520 is blocked.

For example, the processor 130 may control a circuit capable of applying a voltage to the transmittance adjusting material existing at a position of the glass 123 corresponding to the object region 520. In this case, the light corresponding to the object region 520 may not be transmitted but may be blocked (absorbed or reflected) due to a decrease in transmittance of the transmittance adjusting material of the glass 123 corresponding to the object region 520.

The processor 130 may obtain an image, in which pixels existing in the object region 520 are black, by capturing the imaging region 500 to not capture the object region 520 through the camera 120.

In the embodiment described above, the electronic apparatus 100 and the predetermined object are positioned or exist in a house, but this is merely an embodiment, and the electronic apparatus 100 and the predetermined object may be positioned or exist outside of the house.

For example, assuming that the electronic apparatus 100 is a self-driving vehicle, when the electronic apparatus 100 travels on the road, the electronic apparatus 100 may capture the road and the environment around the road, obtain information regarding objects by detecting objects (e.g., a person or a number plate of a vehicle) existing in an imaging region through the sensor 110, and control the camera 120 to not capture an object region.

According to the aforementioned various embodiments of the disclosure, the electronic apparatus 100 protecting privacy of individuals may be provided.

The electronic apparatus 100 of the disclosure may generate an image of a remaining region excluding a person's face, when capturing an image. Accordingly, possibility of leakage of an image comprising a person's face or invasion of privacy due to the image comprising a person's face may be fundamentally avoided.

In addition, a service that collects (or provides) images not invading privacy of individuals may be provided.

According to various embodiments of the disclosure, the electronic apparatus 100 of the disclosure may provide a privacy mode by user setting.

The processor 130 may control the output interface 160 to provide a UI for setting the privacy mode (e.g., guidance messages, menu for selecting the privacy mode, and the like).

When a user command made from the selection of the turning on (or off) of the privacy mode on the UI for setting the privacy mode through the input interface 170 or the communication interface 150 is received, the processor 130 may store privacy setting information in which the privacy mode is set to be on (or off) in the memory 140.

When the privacy mode is set to be on, the processor 130 may control the camera 120 to not capture the object region as described above, and when the privacy mode is set to be off, the processor 130 may control the camera 120 to capture the object region.

When the privacy mode is on, the processor 130 may control the camera 120 to not capture all of predetermined objects (e.g., persons) existing in an imaging region, or may also control the camera 120 to not capture only a person registered as a user or to not capture only persons not registered as a user among a plurality of predetermined objects existing in an imaging region. Information regarding such operations of the processor 130 may be stored together with the privacy setting information and may be changed by user setting.

According to various embodiments of the disclosure, the electronic apparatus 100 of the disclosure may provide a security mode by user setting.

The processor 130 may control the output interface 160 to provide a UI for setting the security mode (e.g., guidance messages, menu for selecting the privacy mode, and the like).

When a user command made from the selection of the turning on (or off) of the security mode on the UI for setting the security mode through the input interface 170 or the communication interface 150 is received, the processor 130 may store security setting information in which the security mode is set to be on (or off) in the memory 140.

When the privacy mode is set to be on, the processor 130 may obtain information regarding a predetermined object (e.g., a person not registered as a user or the like) among a plurality of objects existing in a region detected through the sensor 110, and control the camera 120 or the electronic apparatus 100 to move the position of the camera 120 or the electronic apparatus 100 or rotate the direction thereof, so that a region (or position), where the predetermined object exists, is included in an imaging region of the camera 120.

The processor 130 may control the camera 120 to capture the predetermined object existing in the imaging region of the camera 120. In this case, the processor 130 may store an image captured by the camera 120 in the memory 140 or control the communication interface 150 to transmit the image to an external electronic apparatus (e.g., a smart phone, a server, or the like).

When both the privacy mode and the security mode are on, the processor 130 may also control the camera 120 to capture a person not registered as a user while not imaging a person registered as a user, among the plurality of predetermined objects existing in the imaging region.

The electronic apparatus 100 according to an embodiment of the disclosure described above may provide an image captured by excluding a specific person or following an unspecific person in accordance with the privacy mode and/or the security mode, and an external electronic apparatus may also access, receive, and check the image.

FIG. 6 is a block diagram illustrating an example configuration of the electronic apparatus according to an embodiment of the disclosure.

Referring to FIG. 6, the electronic apparatus 100 may include one of the memory 140, the communication interface (e.g., including communication circuitry) 150, the output interface (e.g., including output circuitry) 160, and the input interface (e.g., including input circuitry) 170, in addition to the sensor 110, the camera 120, and the processor (e.g., including processing circuitry) 130.

The memory 140 may store various instructions, programs, or pieces of data necessary for the operations of the electronic apparatus 100 or the processor 130. For example, the memory 140 may store images obtained by the camera 120, information obtained by the sensor 110, and data received from an external electronic apparatus (not shown).

The memory 140 may be implemented as a non-volatile memory, a volatile memory, a flash memory, a hard disk drive (HDD), or a solid-state drive (SSD). The memory 140 may be accessed by the processor 130 and reading, recording, editing, deleting, or updating of the data by the processor 130 may be executed. A term memory in the disclosure may include the memory 140, a RAM (not shown) or a ROM (not shown) in the processor 130, or a memory card (not shown) (for example, a micro SD card or memory stick) mounted on the electronic apparatus 100.

The communication interface 150 may include various communication circuitry and transmit and receive various types of data by executing communication with various types of external device according to various types of communication system. The communication interface 150 may include various chips, each including various communication circuitry, including, for example, and without limitation, at least one of a Bluetooth chip (not shown), a Wi-Fi chip (not shown), and a wireless communication chip (not shown) for executing wireless communication, and an Ethernet module (not shown) and a USB module (not shown) for executing wired communication. In this case, the Ethernet module (not shown) and the USB module (not shown) for executing wired communication may execute the communication with an external device through an input and output port 170.

The output interface 160 may include various output circuitry and may refer, for example, to a component for outputting information and may include at least one circuit. The output image may be implemented in a form of an image or sound.

For example, the output interface 160 may include various output circuitry including, for example, and without limitation, a display (not shown) and a speaker (not shown). The display may display image data processed by an image processing unit (not shown) on a display region (or display). The display region may refer, for example, to at least a part of a display exposed to one surface of a housing of the electronic apparatus 100. At least a part of the display is a flexible display and may be combined with at least one of a front surface region, a side surface region, and a rear surface region of the electronic apparatus 100. The flexible display is paper thin and may be curved, bent, or rolled without damages using a flexible substrate. The speaker is embedded in the electronic apparatus 100 and may output various alerts or voicemails directly as sound, in addition to various pieces of audio data subjected to various processing operations such as decoding, amplification, noise filtering, and the like by an audio processing unit (not shown).

The input interface 170 may include various input circuitry and receive various types of user command and transmit the user command to the processor 130.

The input interface 170 may include various input circuitry, such as, for example, and without limitation, a touch panel, a (digital) pen sensor, or keys. In the touch panel, at least one type of a capacitive type, a pressure sensitive type, an infrared type, and an ultrasonic type may be used. In addition, the touch panel may further include a control circuit. The touch panel may further include a tactile layer and provide a user a tactile reaction. The (digital) pen sensor may be, for example, a part of the touch panel or may include a separate sheet for recognition. The keys may include, for example, physical buttons, optical keys, or a keypad. In addition, the input interface 170 may be connected to an external device (not shown) such as a keyboard or a mouse in a wired or wireless manner to receive a user input.

The input interface 170 may include a microphone capable of receiving voice of a user. The microphone may be embedded in the electronic apparatus 100 or may be implemented as an external device and connected to the electronic apparatus 100 in a wired or wireless manner. The microphone may directly receive voice of a user and obtain an audio signal by converting the voice of a user which is an analog signal into a digital signal by a digital conversion unit (not shown).

The electronic apparatus 100 may further include an input and output port (not shown).

The input and output port (not shown) is a component which connects the electronic apparatus 100 to an external device (not shown) in a wired manner so that the electronic apparatus 100 may transmit and/or receive an image and/or a signal regarding voice to and from the external device (not shown).

For this, the input and output port (not shown) may be implemented as a wired port such as an HDMI port, a display port, an RGB port, a digital visual interface (DVI) port, a Thunderbolt port, and a component port.

As an example, the electronic apparatus 100 may receive an image and/or a signal regarding voice from an external device (not shown) through the input and output port (not shown) so that the electronic apparatus 100 may output the image and/or the voice. As another example, the electronic apparatus 100 may transmit a specific image and/or a signal regarding voice to an external device (not shown) through an input and output port (not shown) so that the external device may output the image and/or the voice.

As described above, the image and/or the signal regarding voice may be transmitted in one direction through the input and output port (not shown). However, this is merely an embodiment, and the image and/or the signal regarding voice may be transmitted in both directions through the input and output port (not shown).

Figure 7:
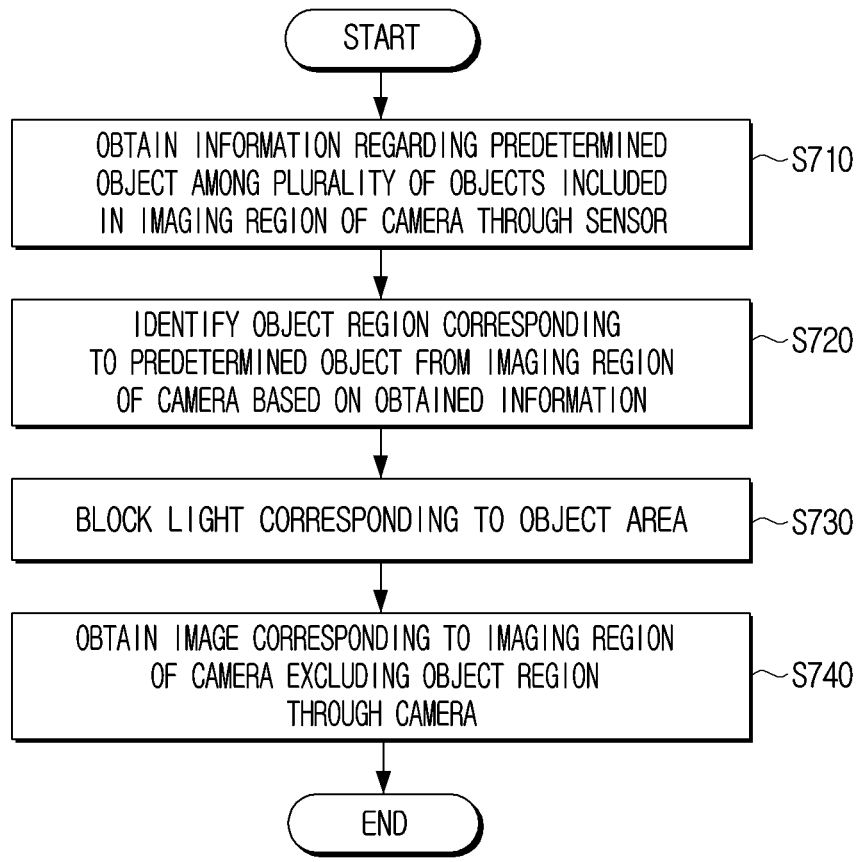
FIG. 7 is a flowchart illustrating an example method of controlling an electronic apparatus according to an embodiment.

FIG. 7 is a flowchart illustrating an example method of controlling an electronic apparatus according to an embodiment of the disclosure.

A method of controlling the electronic apparatus 100 of the disclosure includes obtaining information regarding a predetermined object among a plurality of objects existing in an imaging region of the camera 120 through the sensor 110, identifying an object region corresponding to the predetermined object from the imaging region of the camera 120 based on the information regarding the object, blocking a light corresponding to the object area, and, obtaining an image corresponding to the imaging region of the camera 120 excluding the object region through the camera 120.

Referring to FIG. 7, in the method of controlling the electronic apparatus 100, information regarding a predetermined object among a plurality of objects existing in an imaging region of the camera 120 may be obtained through the sensor 110 (S710). In this case, the electronic apparatus 100 may be positioned in a house and the predetermined object may include a person in the house.

The camera 120 may include the lens 121 and the image sensor 122 comprising the plurality of light detection elements and for obtaining an image corresponding to the imaging region excluding the object region based on light transmitted through the lens 121.

The sensor 110 may include at least one of a laser sensor, an ultrasonic wave sensor, an infrared ray sensor, and a heat detection sensor.

An object region corresponding to the predetermined object may be identified (or determined) from the imaging region of the camera 120 based on the information regarding the object (S720). In this case, the information regarding the predetermined object may include a distance between the camera 120 and the predetermined object and a size of the predetermined object.

The identifying the object region may include identifying an object region from the imaging region of the camera 120 based on a distance between the camera 120 and the predetermined object and a size of the predetermined object obtained through the sensor 110, and a focal length of the camera 120.

A light corresponding to the object area may be blocked (S730). An image corresponding to the imaging region of the camera 120 excluding the object region through the camera 120 may be obtained (S740).

The controlling the camera 120 may include cutting off a power supply of at least one light detection element corresponding to the object region among the plurality of light detection elements.

The camera 120 may further include the glass 123 having adjustable transmittance which is disposed on a path of light, and the controlling camera 120 may include adjusting transmittance of the glass 123 to block light corresponding to the object region.

According to various embodiments of the disclosure described above, the controlling method of the electronic apparatus 100 protecting privacy of individuals may be provided.

By the controlling method of the electronic apparatus 100 of the disclosure, an image of the remaining region excluding a person's face may be generated, when capturing an image. Accordingly, possibility of leakage of an image comprising a person's face or invasion of privacy due to the image comprising a person's face may be fundamentally avoided.

In addition, a service that collects (or provides) images not invading privacy of individuals may be provided.

Various embodiments of the disclosure may be implemented as software comprising instructions stored in machine (e.g., computer)-readable storage media. The machine herein may be an apparatus which invokes instructions stored in the storage medium and is operated according to the invoked instructions, and may include an electronic apparatus (e.g., electronic apparatus 100) according to the disclosed embodiments. In a case where the instruction is executed by a processor 130, the processor 130 may execute a function corresponding to the instruction directly or using other elements under the control of the processor 130. The instruction may include a code generated by a compiler or a code executed by an interpreter. The machine-readable storage medium may be provided in a form of a non-transitory storage medium. The "non-transitory" storage medium is tangible and may not include signals, and it does not distinguish that data is semi-permanently or temporarily stored in the storage medium.

The methods according to various embodiments of the disclosure may be provided to be included in a computer program product. The computer program product may be exchanged between a seller and a purchaser as a commercially available product. The computer program product may be distributed in the form of a machine-readable storage medium (e.g., compact disc read only memory (CD-ROM) or distributed online through an application store (e.g., PlayStore™). In a case of the online distribution, at least a part of the computer program product may be temporarily stored or temporarily generated at least in a storage medium such as a memory of a server of a manufacturer, a server of an application store, or a relay server.

Each of the elements (for example, a module or a program) according to various embodiments may include a single entity or a plurality of entities, and some sub-elements of the abovementioned sub-elements may be omitted or other sub-elements may be further included in various embodiments. Alternatively or additionally, some elements (e.g., modules or programs) may be integrated into one entity to perform the same or similar functions performed by each respective element prior to integration. Operations performed by a module, a program, or other elements, in accordance with various embodiments, may be performed sequentially, in a parallel, repetitive, or heuristically manner, or at least some operations may be performed in a different order, omitted, or may add a different operation.

While the disclosure has been illustrated and described with reference to various example embodiments, it will be understood that the various example embodiments are intended to be illustrative, not limiting. One of ordinary skill in the art will understand that various changes in form and detail may be made without departing from the spirit and scope of the disclosure, including the appended claims and their equivalents.

What is claimed is:

1. An electronic apparatus comprising:
   a sensor;
   a camera comprising a lens and an image sensor comprising a plurality of light detectors configured to obtain images corresponding to an imaging region of the camera through the lens; and
   a processor configured to control the electronic apparatus to:
   obtain information regarding a predetermined object among a plurality of objects included in an imaging region of the camera through the sensor, wherein the information comprises a distance between the camera and the predetermined object and a size of the predetermined object obtained through the sensor,
   identify whether an object among the plurality of objects corresponds to the predetermined object based on the obtained information and information regarding the predetermined object,
   identify an object region corresponding to the predetermined object from the imaging region of the camera based on the obtained information and focal length of the camera,
   control the camera to block a light corresponding to the identified object area by cutting off a power supply of at least one light detector corresponding to the object region among the plurality of light detectors, and
   obtain an image corresponding to the imaging region of the camera excluding the object region through the camera.

2. The apparatus according to claim 1, wherein the electronic apparatus is configured to operate in a house, and
   wherein the predetermined object includes a person in the house.

3. The apparatus according to claim 1, wherein the camera further comprises: a glass having adjustable transmittance disposed on a path of the light,
   wherein the processor is configured to control the electronic apparatus to adjust transmittance of the glass to block light corresponding to the object region.

4. The apparatus according to claim 1, wherein the processor is configured to control the electronic apparatus to identify the object region from the imaging region of the camera based on a distance between the camera and the predetermined object and a size of the predetermined object obtained through the sensor, and a focal length of the camera.

5. The apparatus according to claim 1, wherein the sensor comprises at least one of a laser sensor, an ultrasonic wave sensor, an infrared ray sensor, and a heat detection sensor.

6. A method of controlling an electronic apparatus comprising a sensor and a camera comprising a lens and an image sensor comprising a plurality of light detection elements configured to obtain images corresponding to an imaging region of the camera through the lens, the method comprising:
   obtaining information regarding a predetermined object among a plurality of objects included in an imaging region of the camera through the sensor, wherein the information comprises a distance between the camera and the predetermined object and a size of the predetermined object obtained through the sensor;
   identifying whether an object among the plurality of objects corresponds to the predetermined object based on the obtained information and information regarding the predetermined object;
   identifying an object region corresponding to the predetermined object from the imaging region of the camera based on the obtained information and focal length of the camera;
   controlling the camera to block a light corresponding to the identified object area by cutting off a power supply of at least one light detection element corresponding to the object region among the plurality of light detection; and
   obtaining an image corresponding to the imaging region of the camera excluding the object region through the camera.

7. The method according to claim 6, wherein the electronic apparatus is configured to be operated in a house,
   wherein the predetermined object comprises a person in the house.

8. The method according to claim 6, wherein the camera further comprises a glass having adjustable transmittance disposed on a path of the light, and
   wherein the controlling the camera comprises adjusting transmittance of the glass to block light corresponding to the object region.

9. The method according to claim 6, wherein the identifying the object region comprises identifying the object region from the imaging region of the camera based on a distance between the camera and the predetermined object and a size of the predetermined object obtained through the sensor, and a focal length of the camera.

10. The method according to claim 6, wherein the sensor comprises at least one of a laser sensor, an ultrasonic wave sensor, an infrared ray sensor, and a heat detection sensor.

11. A electronic apparatus comprising:
a camera comprising a lens and an image sensor comprising a plurality of light detection elements configured to obtain images corresponding to an imaging region of the camera through the lens;
a sensor configured to detect a predetermined object among a plurality of objects included in the imaging region of the camera; and
a processor configured to control the electronic apparatus to:
  obtain, from the sensor, information regarding a position of the predetermined object in the imaging region of the camera,
  identify an object region, in the imaging region of the camera, corresponding to the predetermined object based on the obtained information,
control the camera to block a light corresponding to the identified object area by cutting off a power supply of a portion of the light detection elements corresponding to the identified object region, and
obtain, from the camera, an image captured by the camera during a period when the power supply of the portion of the light detection elements is cut off.

12. The apparatus according to claim 11, wherein the sensor comprises a heat detection sensor.

* * * * *